US012175961B2

(12) United States Patent
Jang et al.

(10) Patent No.: US 12,175,961 B2
(45) Date of Patent: Dec. 24, 2024

(54) METHOD AND APPARATUS FOR NOISE CANCELING

(71) Applicant: HYUNDAI MOBIS CO., LTD., Seoul (KR)

(72) Inventors: Se Yeong Jang, Yongin-si (KR); Joo Won Park, Yongin-si (KR); Dong Hwan Kim, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 288 days.

(21) Appl. No.: 17/957,269

(22) Filed: Sep. 30, 2022

(65) Prior Publication Data

US 2023/0169950 A1 Jun. 1, 2023

(30) Foreign Application Priority Data

Nov. 26, 2021 (KR) ........................ 10-2021-0165580

(51) Int. Cl.
*G10K 11/178* (2006.01)

(52) U.S. Cl.
CPC .... *G10K 11/17854* (2018.01); *G10K 11/1783* (2018.01); *G10K 2210/1282* (2013.01); *G10K 2210/3028* (2013.01); *G10K 2210/501* (2013.01)

(58) Field of Classification Search
CPC ....... G10K 11/17854; G10K 11/17835; G10K 11/17833; G10K 11/1783; G10K 2210/115; G10K 2210/12; G10K 2210/128; G10K 2210/1282; G10K 2210/12821; G10K 2210/3039; G10K 2210/30391
See application file for complete search history.

(56) References Cited

U.S. PATENT DOCUMENTS

| | | | |
|---|---|---|---|
| 10,950,216 | B2 | 3/2021 | Tani |
| 2011/0142248 | A1 | 6/2011 | Sakamoto et al. |

*Primary Examiner* — Kile O Blair
(74) *Attorney, Agent, or Firm* — NovoTechIP International PLLC

(57) ABSTRACT

A method of canceling road noise includes: receiving a first signal from an acceleration sensor disposed at a vehicle and a second signal from a microphone disposed at the vehicle; monitoring, based on the first and second signals, whether an abnormal event has occurred; determining, based on a result from monitoring whether the abnormal event has occurred, a plurality of parameter values for performing adaptive filtering; and performing, based on the determined parameter values, adaptive filtering to generating an output signal for noise canceling.

13 Claims, 3 Drawing Sheets

METHOD AND APPARATUS FOR NOISE CANCELING

CROSS-REFERENCE TO RELATED APPLICATIONS

This application claims the benefit of priority to Korean Patent Application No. 10-2021-0165580, filed on Nov. 26, 2021, the disclosure of which is incorporated by reference herein in its entirety.

TECHNICAL FIELD

The present disclosure relates to a method and apparatus for noise canceling.

BACKGROUND

The description in this section merely provides background information on embodiments of the present disclosure and does not necessarily constitute the related art.

Active noise canceling is a technology that detects a sound which is a source of noise through an input sensor such as a microphone, and generates a signal with the same amplitude but with antiphase in order to cancel the noise. A conventional active noise canceling apparatus generates an antiphase signal through a controller by analyzing a signal detected by an input sensor such as a microphone or an acceleration sensor. The generated antiphase signal is mixed with a sound source signal and then sent to a speaker, thereby canceling a certain part of various noises entering a vehicle.

However, if the active noise canceling apparatus detects a high-amplitude input signal due to a certain impact and produces a noise canceling signal based on this input signal, this may cause a loud impulse noise or a repetitive amplifying noise inside the vehicle. Such noises may be generated due to environmental or operational reasons of a system where the active noise canceling apparatus is mounted, as well as a direct impact on the input sensor. For example, such noises may be generated when a vehicle drives on an irregular road (e.g., a rough road, damaged road, etc.) or an unpredictable event (e.g., a sudden noise) occurs due to the surrounding environment of the vehicle. Meanwhile, such an impulse noise or repetitive amplifying noise may be detected as an input signal itself and cause other problems that interfere with active noise canceling.

SUMMARY

According to an aspect of the present disclosure, it is possible to prevent factors that can interrupt a logic for performing active noise canceling by monitoring inputs and outputs of a noise canceling system.

The aspects of the present disclosure are not limited to the foregoing, and other aspects not mentioned herein will be able to be clearly understood by those skilled in the art from the following description.

In one aspect, a method of canceling road noise includes: receiving a first signal from an acceleration sensor disposed at a vehicle and a second signal from a microphone disposed at the vehicle; monitoring, based on the first and second signals, whether an abnormal event has occurred; determining, based on a result from monitoring whether the abnormal event has occurred, a plurality of parameter values for performing adaptive filtering; and performing, based on the determined parameter values, adaptive filtering to generating an output signal for noise canceling.

In another aspect, a road noise canceling apparatus includes: an input unit configured to receive a first signal from an acceleration sensor disposed at a vehicle and a second signal from a microphone disposed at the vehicle; a preprocessing unit configured to monitor whether an abnormal event has occurred based on the first signal and the second signal, and determine a plurality of parameter values for performing adaptive filtering based on a result of determining whether the abnormal event has occurred; an output signal generator configured to perform adaptive filtering based on the determined parameter values and generate an output signal for noise canceling; and an output unit configured to produce a noise canceling signal based on the output signal.

Other features and aspects will be apparent from the following detailed description, the drawings, and the claims.

According to an aspect of the present disclosure, it is possible to minimize performance limitations of an adaptive filtering algorithm by eliminating factors that interfere with normal operation of noise canceling in advance by monitoring an input signal and determining a parameter value for performing adaptive filtering, and ensure stability and mass productivity.

According to an aspect of the present disclosure, it is possible to prevent divergence of an output signal or a noise canceling signal by monitoring whether the output signal is clipped or not.

The effects of the present disclosure are not limited to the foregoing, and other effects not mentioned herein will be able to be clearly understood by those skilled in the art from the following description.

DETAILED DESCRIPTION

Figure 1:
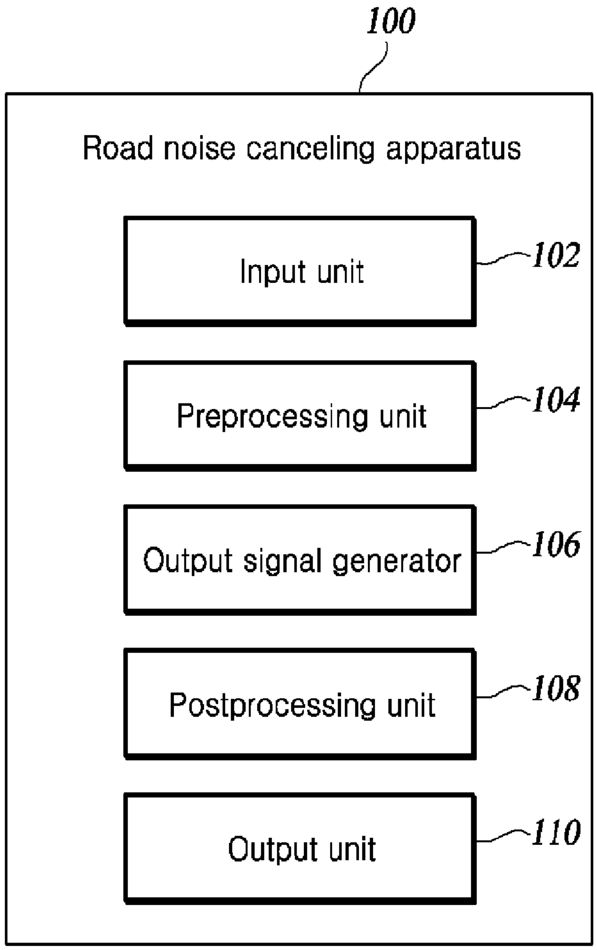
FIG. 1 shows a block diagram for a road noise canceling apparatus according to an embodiment of the present disclosure.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered obscuring the subject of the present disclosure will be omitted for the purpose of clarity and for brevity.

Additionally, various terms such as first, second, A, B, (a), (b), etc., are used solely for the purpose of differentiating one component from others but not to imply or suggest the substances, the order or sequence of the components. Throughout this specification, when parts “include” or “comprise” a component, they are meant to further include other components, not excluding thereof unless there is a particular description contrary thereto. The terms such as “unit,” “module,” and the like refer to units for processing at least one function or operation, which may be implemented by hardware, software, or a combination thereof.

The detailed description set forth below in conjunction with the appended drawings is intended to describe exemplary embodiments of the present disclosure and is not intended to represent the only embodiments in which the present disclosure may be practiced.

A road noise canceling method of the present disclosure may be performed by a road noise canceling apparatus, and the road noise canceling apparatus may be implemented on a computing device. The road noise canceling apparatus may perform each function by one or more processors operable by the computing device, and includes computer readable storage connected to such a processor(s), with instructions stored therein.

FIG. 1 shows a block diagram for a road noise canceling apparatus according to an embodiment of the present disclosure.

A road noise canceling apparatus 100 according to an embodiment of the present disclosure includes all or part of an input unit 102, a preprocessing unit 104, an output signal generator 106, a postprocessing unit 108, and an output unit 110. The road noise canceling apparatus illustrated in FIG. 1 is in accordance with an embodiment of the present disclosure. Not every component illustrated in FIG. 1 is essential, and, in other embodiments, some components may be added, changed, or deleted.

FIG. 1 illustrates the road noise canceling apparatus 100 as equipment only for convenience of explanation, and in other embodiments, the road noise canceling apparatus 100 may be implemented as a software module or processor that performs the functions of the components 102 to 110.

The input unit 102 receives an input signal from a sensor. The input unit 102 may receive input signals from two or more sensors (e.g., an acceleration sensor, a microphone, etc.). The input unit 102 may receive a first input signal from at least one acceleration sensor disposed at (or mounted on) a vehicle and a second input signal from at least one microphone disposed at the vehicle.

The preprocessing unit 104 monitors at least one input signal and determines parameter values for performing an active noise canceling algorithm based on a monitoring result. The preprocessing unit 104 may monitor whether an abnormal event occurs based on the first input signal and the second input signal, and determine parameter values for performing adaptive filtering based on a monitoring result. The abnormal event may include transient impulsive noises when a vehicle drives on an irregular road (e.g., a rough road, damaged road, etc.) or unpredictable sudden noises due to the surrounding environment of the vehicle. Here, the adaptive filtering refers to an active noise canceling technique which find an optimal solution by adjusting parameters (e.g., filter coefficients) on its own in accordance with statistical characteristics of an input signal and changes in the surrounding environment. To perform such adaptive filtering, the preprocessing unit 104 may employ an FxLMS (Filtered-x Least-Mean-Square) algorithm or a Feed-forward FxLMS algorithm.

The preprocessing unit 104 detects an abnormal event, i.e. a rapid change in input signal by monitoring the input signals. Such detection may be performed by comparing a short-term level of the first input signal with a long-term level of the first input signal. The short-term level of the first input signal may mean a current level of the first input signal. The long-term level of the first input signal may mean a previous level of the first input signal or an average level of the first input signals sampled during a certain period. Alternatively, Such detection may be performed by comparing the short-term level of the first input signal with a short-term level of the second input signal. The short-term level of the second input signal may mean a current level of the second input signal. The preprocessing unit 104 may use two indices of Equations 1 and 2 in order to detect a moment when an input signal changes rapidly. In Equation 1, a first index may indicate a ratio of a current level of a first input signal to an average level of first input signals sampled during a certain previous period. In Equations 2, a second index may indicate a ratio of a normalized level of a second input signal to a normalized level of a first input signal. Normalization may be used for adjusting values measured on different scales to a notionally common scale. For example, normalization may be used to bring all values into the range [−1, 1].

$$\text{First index} = \frac{\text{first input signal level}}{avg(\text{first input signal level})} \quad \text{[Equation 1]}$$

$$\text{Second index} = \frac{Norm(\text{second input signal level})}{Norm(\text{first input signal level})} \quad \text{[Equation 2]}$$

The preprocessing unit 104 may detect a moment when an input signal changes rapidly, based on a first index indicating the ratio of a short-term level of the first input signal to a long-term level of the first input signal. When the input unit 102 obtains a first input signal and a second input signal from two or more sensors, the preprocessing unit 104 may detect a moment when an input signal changes rapidly, based on a second index indicating the ratio of a short-term level of the second input signal to a short-term level of the first input signal.

For example, the preprocessing unit 104 may calculate a first index of Equation 1, and if the first index is lower than a preset first threshold ratio (hereinafter "first threshold"), it may give an instruction to update parameter values for the active noise canceling algorithm, that is, parameter values for an adaptive filtering algorithm by regarding an input signal as a normal input signal. Alternatively, the preprocessing unit 104 may calculate a second index of Equation 2, and if the first index is equal to or greater than the first threshold and the second index is lower than a preset second threshold ratio (hereinafter "second threshold"), it may give an instruction to use previous parameter values. Alternatively, if the second index is equal to or greater than the second threshold, the preprocessing unit 104 may give an instruction to reset the parameter values to zero.

For another example, the preprocessing unit 104 may set a first threshold and a second threshold (second threshold>first threshold), and may detect an rapid change in the input signal based on a case where the first index or the second index is lower than the first threshold (Case 1), a case where the first index or the second index is equal to or greater than the first threshold and is less than the second threshold (Case 2) and a case where the first index or the second index is equal to or greater than the second threshold (Case 3), so that it gives a corresponding instruction.

In Case 1, the preprocessing unit 104 may give an instruction to perform adaptive filtering in a conventional manner by detecting the input signal as a normal input signal—that is, to perform active noise canceling by actively determining filter coefficients. In Case 2, the preprocessing unit 104 may determine the filter coefficients as previous filter coefficients since output relative to input is not enough to cause divergence, thereby maintaining the stability of the road noise canceling apparatus. In Case 3, since output is expected to diverge, the preprocessing unit 104 may reset the filter coefficients to zero to prevent abnormal noise canceling output.

Assuming that the first input signal is an acceleration signal and the second input signal is a microphone signal, the second index may indicate a ratio of a normalized level of a microphone signal to a normalized level of an acceleration signal. If the ratio of a normalized level of a microphone signal to a normalized level of an acceleration signal is high, there is a risk of divergence because calculations for performing adaptive filtering are affected by microphone signal feedback, resulting in a higher output than an actual acceleration signal level. That is, in Case 1, the input to the road noise canceling apparatus may be deemed as an input given in a normal environment, and therefore the parameter value may be updated in the adopted active noise canceling scheme. In Case 2, it may be determined that the second index is not high enough to cause divergence, and therefore the parameter value may be maintained without being updated. In Case 3, if the second index is high, the input signal is deemed abnormal so that the parameter values may be reset, because producing an active noise canceling signal based on such a microphone signal may cause a divergence of the output signal.

The output signal generator 106 performs adaptive filtering for an input signal based on the determined parameter value and generates an output signal for noise canceling. The output signal may be an antiphase signal of the input signal.

The postprocessing unit 108 determines whether clipping has occurred or not, based on the output signal. Upon determining that clipping has occurred, the postprocessing unit 108 sets the parameter values to zeros, and the output signal generator 106 re-generates an output signal for noise canceling. Upon determining that clipping has not occurred, the postprocessing unit 108 produces an output signal through the output unit 110. The clipping may be detected by comparing the original input signal with an output signal with adjustment for applied gain. For example, if the output unit 110 has 10 dB of applied gain, it can be tested for clipping by attenuating the output signal by 10 dB and comparing it to the input signal. The clipping may be detected by comparing the level of the output signal with a preset threshold, but this is merely an example. For example, the road noise canceling apparatus may determine whether clipping has occurred or not, by further taking into consideration the frequency of clipping and how much clipping affects (for example, audio quality degradation). That is, it may determine whether clipping has occurred or not, by further taking into consideration whether the clipping is temporary or continuous. Alternatively, various algorithms for determining clipping may be adopted. Meanwhile, upon determining that the level of the output signal is lower than a threshold, the postprocessing unit 108 may continue to update the parameter value for adaptive filtering, and upon determining that the level of the output signal is equal to or greater than the threshold, it may initialize the parameter values for adaptive filtering.

The output unit 110 produces a noise canceling signal based on the output signal. The output unit may comprise an output means such as a speaker to output a noise canceling signal. The output unit may send a noise canceling signal to an output device for outputting a noise canceling signal. The output unit 110 may mix the output signal with the input signal or a sound source signal to produce a noise canceling signal and output the noise canceling signal.

The output unit 110 may measure how much a noise is canceled by an output noise canceling signal by using an error microphone, and adaptively apply filter coefficients to minimize the power of an audio signal measured by the error microphone.

As described above, the road noise canceling apparatus 100 comprises a logic for determining a proper parameter value, and performs an adaptive filtering algorithm based on the logic. The road noise canceling apparatus 100 adjusts weights of the algorithm while repeating the adaptive filtering logic, so that active noise canceling may be implemented according to the environment or operating conditions of a system equipped with the road noise canceling apparatus 100.

Figure 2:
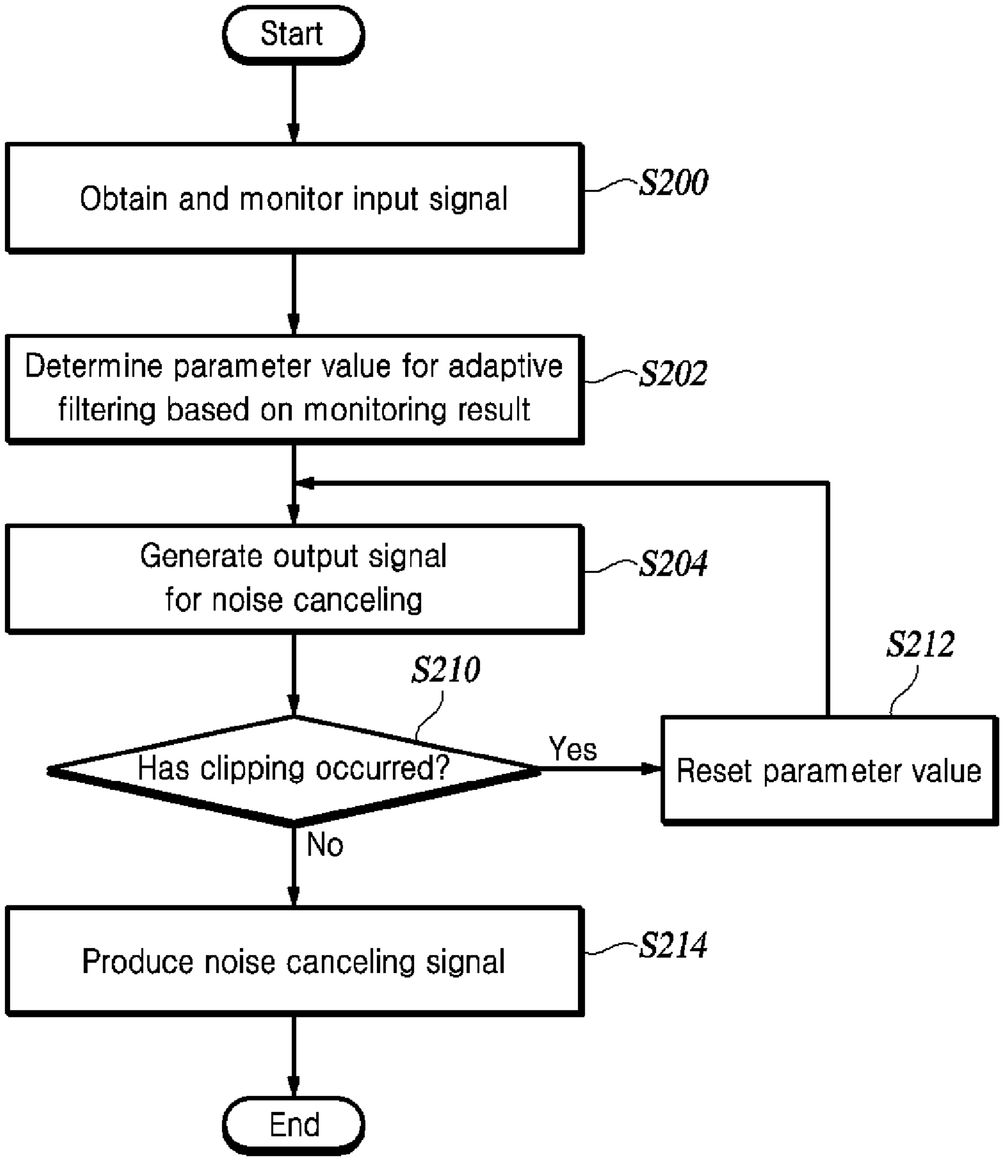
FIG. 2 shows a flowchart for a road noise canceling method according to a first embodiment of the present disclosure.

FIG. 2 shows a flowchart for a road noise canceling method according to a first embodiment of the present disclosure.

The road noise canceling apparatus obtains an input signal and monitors it (S200).

The road noise canceling apparatus determines a parameter value for adaptive filtering based on monitoring results (S202). The road noise canceling apparatus may choose either maintaining the adopted parameter update scheme, using the previous parameter value, or resetting the parameter value as parameter determination scheme, and determine the parameter value accordingly.

The road noise canceling apparatus generates an output signal for noise canceling (S204).

The road noise canceling apparatus determines whether the output signal is clipped or not (S210).

In step S210, upon determining that clipping has occurred, the road noise canceling apparatus resets the parameter value (S212), and repeats step S204.

In step S210, upon determining that clipping has not occurred, the road noise canceling apparatus produces a noise canceling signal based on the output signal (S214).

Figure 3:
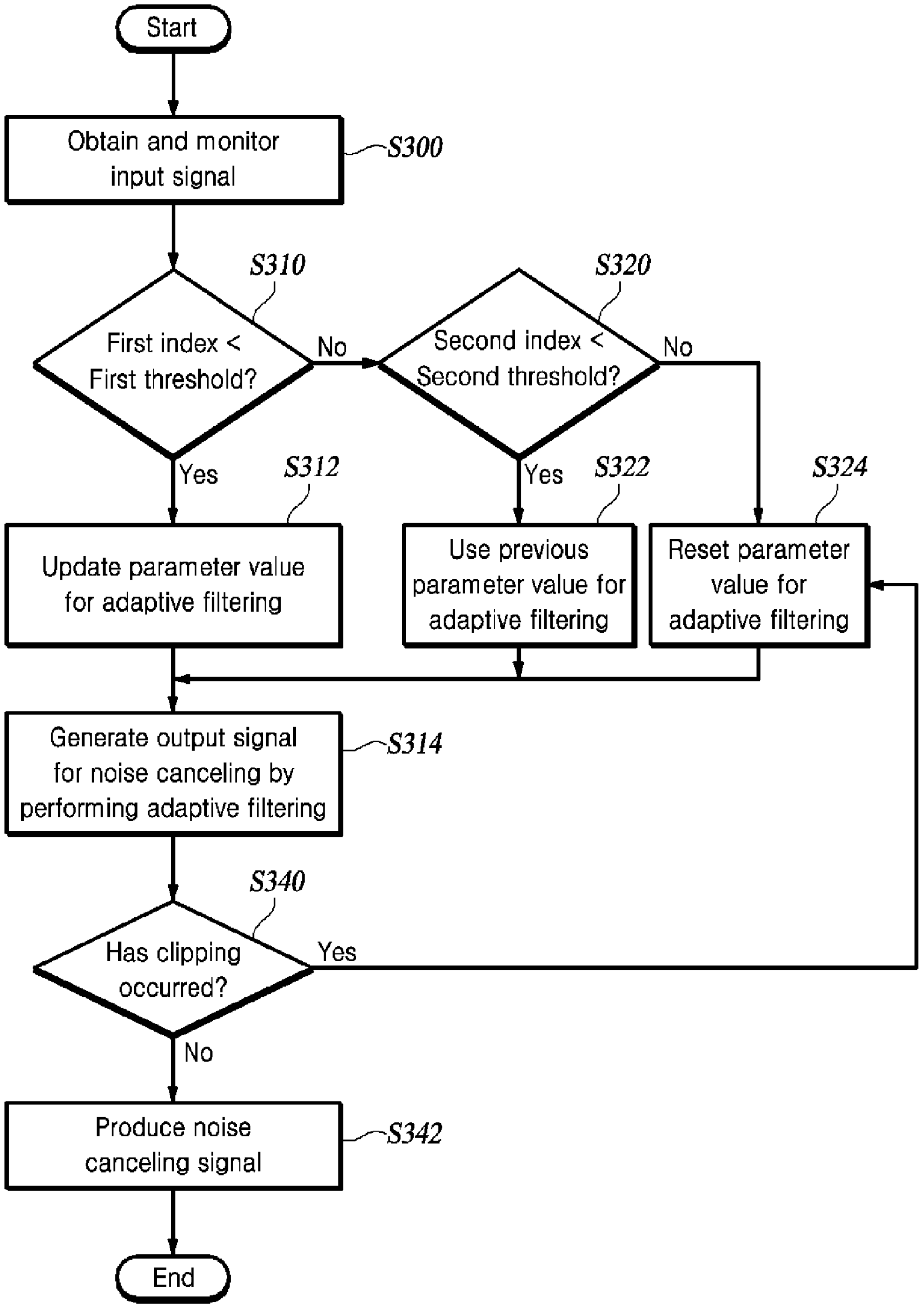
FIG. 3 shows a flowchart for a road noise canceling method according to a second embodiment of the present disclosure.

FIG. 3 shows a flowchart for a road noise canceling method according to a second embodiment of the present disclosure.

The road noise canceling apparatus obtains an input signal and monitors it (S300).

The road noise canceling apparatus generates a first index based on the input signal, and compares the first index with a first threshold (S310).

In step S310, upon determining that the first index is equal to or greater than the first threshold, the road noise canceling apparatus generates a second index based on the input signal and compares the second index with a second threshold (S320). Here, the first index and the second index are indices designed to detect an abnormal input signal or a rapid change in the input signal.

In step S320, upon determining that the second index is lower than the second threshold, the road noise canceling apparatus sets a previous parameter value as a parameter value for adaptive filtering (S322).

In step S320, upon determining that the second index is equal to or greater than the second threshold, the road noise canceling apparatus resets the parameter value for adaptive filtering (S324).

In step S310, upon determining that the first index is lower than the first threshold, the road noise canceling apparatus updates the parameter value for adaptive filtering in the traditional way S312).

After step S312, S322, or S324, the road noise canceling apparatus generates an output signal for noise canceling by performing adaptive filtering (S314).

The road noise canceling apparatus determines whether the output signal is clipped (S340). The determination may be done by comparing the level of the output signal with a preset threshold, but not limited thereto.

Upon determining that clipping has occurred in step S340, the road noise canceling apparatus resets the parameter value (S324), and repeats step S314.

Upon determining that clipping has not occurred in step S340, the road noise canceling apparatus produces a noise canceling signal based on the output signal (S342).

Although the processes in FIGS. 2 and 3 have been described as being sequentially performed, this is only an exemplary description of the technical concept of some of the embodiments of the present disclosure. In other words, those skilled in the art will appreciate that various modifications and changes are possible by changing the order of the processes in FIGS. 2 and 3 or performing one or more of the processes in parallel, without departing from the essential characteristics of some of the embodiments of the present disclosure. Therefore, FIGS. 2 and 3 are not limited to a time-series order.

Various implementations of the devices, units, processes, and steps described herein can be realized in digital electronic circuitry, integrated circuitry, a field programmable gate array (FPGA), an application specific integrated circuit (ASIC), computer hardware, firmware, software, and/or combinations thereof. These various implementations may include being implemented in one or more computer programs executable on a programmable system. The programmable system includes at least one programmable processor (which may be a special purpose processor or a general-purpose processor) coupled to receive data and instructions from, and transmit data and instructions to, a storage system, at least one input device, and at least one output device. Computer programs (also known as programs, software, software applications or code) contain instructions for a programmable processor and are stored on a "computer-readable recording medium."

The computer-readable recording medium includes all kinds of recording devices that store data readable by a computer system. Such a computer-readable recording medium may be a non-volatile or non-transitory medium such as ROM, CD-ROM, a magnetic tape, a floppy disk, a memory card, a hard disk, a magnetic optical disk, a storage device, and the like. Also, it may further include a transitory medium such as a data transmission medium. Further, the computer-readable recording medium may be distributed to computer systems connected via a network so that computer-readable code can be stored and executed in a distributed manner.

Various implementations of the systems and techniques described herein can be realized by a programmable computer. Here, the computer includes a programmable processor, a data storage system (including volatile memory, nonvolatile memory, or any other type of storage system or a combination thereof), and at least one communication interface. For example, the programmable computer may be one of a server, a network device, a set-top box, an embedded device, a computer expansion module, a personal computer, a laptop, a personal data assistant (PDA), a cloud computing system, and a mobile device.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

What is claimed is:

1. A method of canceling road noise comprising:
- receiving a first signal from an acceleration sensor disposed at a vehicle and a second signal from a microphone disposed at the vehicle;
- monitoring, based on the first and second signals, whether an abnormal event has occurred;
- determining, based on a result from monitoring whether the abnormal event has occurred, a plurality of parameter values for performing adaptive filtering; and
- performing, based on the determined parameter values, adaptive filtering to generating an output signal for noise canceling.

2. The method of claim 1, wherein the monitoring whether the abnormal event has occurred comprises:
- determining whether a first index indicating a ratio of a short-term level of the first signal to a long-term level of the first signal is equal to or greater than a first threshold ratio; and
- determining whether a second index indicating a ratio of a short-term level of the second signal to the short-term level of the first signal is equal to or greater than a second threshold ratio.

3. The method of claim 2, wherein determining the parameter values for performing adaptive filtering comprises, in response to determining that the first index is less than the first threshold ratio, maintaining adaptation of the parameter values and updating the parameter values.

4. The method of claim 2, wherein determining the parameter values for performing adaptive filtering comprises, in response to determining that the first index is equal to or greater than the first threshold ratio and the second index is less than the second threshold ratio, stopping adaptation of the parameter values and using previous parameter values.

5. The method of claim 2, wherein determining the parameter values for performing adaptive filtering comprises, in response to determining that the first index is equal to or greater than the first threshold ratio and the second index is equal to or greater than the second threshold ratio, initializing adaptation of the parameter values and resetting the parameter values.

6. The method of claim 1, further comprising:
- determining whether a level of the output signal is equal to or greater than a clipping threshold ratio; and
- in response to determining that the level of the output signal is equal to or greater than the clipping threshold ratio, initializing adaptation of the parameter values and resetting the parameter values.

7. A road noise canceling apparatus, comprising:
- an input unit configured to receive a first signal from an acceleration sensor disposed at a vehicle and a second signal from a microphone disposed at the vehicle;
- a preprocessing unit configured to monitor whether an abnormal event has occurred based on the first signal and the second signal, and determine a plurality of parameter values for performing adaptive filtering based on a result of determining whether the abnormal event has occurred;

an output signal generator configured to perform adaptive filtering based on the determined parameter values and generate an output signal for noise canceling; and an output unit configured to produce a noise canceling signal based on the output signal.

8. The road noise canceling apparatus of claim 7, wherein, for monitoring whether the abnormal event has occurred, the preprocessing unit is configured to:

determine whether a first index indicating a ratio of a short-term level of the first signal to a long-term level of the first signal is equal to or greater than a first threshold ratio; and determine whether a second index indicating a ratio of a short-term level of the second signal to the short-term level of the first signal is equal to or greater than a second threshold.

9. The road noise canceling apparatus of claim 8, wherein, for determining the parameter values for performing adaptive filtering, the preprocessing unit is configured to, in response to determining that the first index is less than the first threshold ratio, maintain adaptation of the parameter values and update the parameter values.

10. The road noise canceling apparatus of claim 8, wherein, for determining the parameter values for performing adaptive filtering, the preprocessing unit is configured to, in response to determining that the first index is equal to or greater than the first threshold ratio and the second index is less than the second threshold ratio, stop adaptation of the parameter values and use previous parameter values.

11. The road noise canceling apparatus of claim 8, wherein, for determining the parameter values for performing adaptive filtering, the preprocessing unit is configured to, in response to determining that the first index is equal to or greater than the first threshold ratio and the second index is equal to or greater than the second threshold ratio, initialize adaptation of the parameter values and reset the parameter values.

12. The road noise canceling apparatus of claim 7, further comprising a postprocessing unit configured to:

determine whether a level of the output signal is equal to or greater than a clipping threshold ratio; and in response to determining that the level of the output signal is equal to or greater than the clipping threshold ratio, initialize adaptation of the parameter values and reset the parameter values.

13. A non-transitory computer-readable storage medium storing instructions that, when executed by one or more processors, cause the one or more processors to control a road noise canceling apparatus to perform:

receiving a first signal from an acceleration sensor disposed at a vehicle and a second signal from a microphone disposed at the vehicle;

monitoring whether an abnormal event has occurred based on the first signal and the second signal;

determining, based on a result of monitoring whether an abnormal event has occurred, a plurality of parameter values for performing adaptive filtering; and performing, based on the determined parameter values, adaptive filtering to generate an output signal for noise canceling.

* * * * *